(12) United States Patent
Pu et al.

(10) Patent No.: US 11,988,519 B2
(45) Date of Patent: May 21, 2024

(54) NAVIGATION METHOD, DEVICE, AND SYSTEM

(71) Applicant: Hangzhou Hikvision Digital Technology Co., Ltd., Hangzhou (CN)

(72) Inventors: Shiliang Pu, Hangzhou (CN); Jianxin Meng, Hangzhou (CN); Jiang Zhu, Hangzhou (CN); Linjie Shen, Hangzhou (CN); Hai Yu, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 945 days.

(21) Appl. No.: 16/313,717

(22) PCT Filed: Feb. 13, 2017

(86) PCT No.: PCT/CN2017/073349
§ 371 (c)(1),
(2) Date: Dec. 27, 2018

(87) PCT Pub. No.: WO2018/000823
PCT Pub. Date: Jan. 4, 2018

(65) Prior Publication Data
US 2019/0316927 A1 Oct. 17, 2019
US 2020/0292347 A9 Sep. 17, 2020

(30) Foreign Application Priority Data

Jun. 29, 2016 (CN) .......................... 201610520497.9

(51) Int. Cl.
G01C 21/36 (2006.01)
G01C 21/16 (2006.01)
G08G 1/14 (2006.01)

(52) U.S. Cl.
CPC .......... *G01C 21/362* (2013.01); *G01C 21/16* (2013.01); *G01C 21/3623* (2013.01)

(58) Field of Classification Search
CPC .. G01C 21/362; G01C 21/16; G01C 21/3623; G01C 21/3685; G01C 21/1656; G01C 21/3602; G08G 1/146
See application file for complete search history.

(56) References Cited

U.S. PATENT DOCUMENTS 7,668,646 B2 * 2/2010 Sasano ............... G01C 21/3685
701/416
8,655,593 B1 2/2014 Davidson
(Continued)

FOREIGN PATENT DOCUMENTS

CN 202472960 U 10/2012
CN 102937452 A 2/2013
(Continued)

OTHER PUBLICATIONS

CN-105513403-A Translation (Year: 2016).*

*Primary Examiner* — Kenneth J Malkowski
*Assistant Examiner* — Ibrahim Abdoalatif Alsomairy
(74) *Attorney, Agent, or Firm* — Clements Bernard Walker; Christopher L. Bernard

(57) ABSTRACT

Embodiments of the present application provide a navigation method, device and system. The method is applicable to a server and comprises: receiving current position characteristic information sent by a mobile terminal, and determining a position of an area matching the current position characteristic information based on the current position characteristic information and a locally stored database, and taking the determined position as an initial position; receiving target position characteristic information sent by the mobile terminal, determining a position of an area matching the target position characteristic information based on the (Continued)

target position characteristic information and the database, and taking the determined position as a target position; and determining a first route from the initial position to the target position and displaying the first route on an electronic map of the mobile terminal. Embodiments of the present application can provide users with accurate navigation information and improve user experience.

8 Claims, 7 Drawing Sheets

(56) References Cited

U.S. PATENT DOCUMENTS

| | | | | |
|---|---|---|---|---|
| 9,076,040 | B1* | 7/2015 | Jing | G01C 21/20 |
| 9,080,878 | B2* | 7/2015 | Skinder | G08G 1/144 |
| 9,631,941 | B2* | 4/2017 | Sugimoto | H04N 7/183 |
| 2003/0008670 | A1* | 1/2003 | Katoh | G01C 21/3655 |
| | | | | 455/456.1 |
| 2004/0171391 | A1* | 9/2004 | Muramatsu | G01S 19/09 |
| | | | | 455/456.6 |
| 2004/0210382 | A1* | 10/2004 | Itabashi | G01C 21/3647 |
| | | | | 701/420 |
| 2004/0220729 | A1* | 11/2004 | Park | G01C 21/3415 |
| | | | | 701/410 |
| 2006/0004512 | A1* | 1/2006 | Herbst | G06Q 30/0241 |
| | | | | 701/431 |
| 2006/0271278 | A1* | 11/2006 | Sakakibara | G08G 1/168 |
| | | | | 340/932.2 |
| 2007/0225910 | A1* | 9/2007 | Fujiwara | G01C 21/3605 |
| | | | | 701/425 |
| 2009/0182497 | A1* | 7/2009 | Hagiwara | G01C 21/36 |
| | | | | 701/533 |
| 2013/0054129 | A1 | 2/2013 | Wong et al. | |
| 2013/0210459 | A1* | 8/2013 | Takahashi | G01C 21/206 |
| | | | | 455/456.2 |
| 2015/0138001 | A1* | 5/2015 | Davies | G08G 1/146 |
| | | | | 340/932.2 |
| 2017/0083024 | A1* | 3/2017 | Reijersen Van Buuren | |
| | | | | G05D 1/0094 |
| 2017/0148324 | A1* | 5/2017 | High | G08G 1/144 |
| 2017/0330397 | A1* | 11/2017 | Palmer | B60R 1/00 |

FOREIGN PATENT DOCUMENTS

| | | | |
|---|---|---|---|
| CN | 103398717 A | | 11/2013 |
| CN | 103440782 A | | 12/2013 |
| CN | 103730023 A | | 4/2014 |
| CN | 103745616 A | | 4/2014 |
| CN | 103942973 A | | 7/2014 |
| CN | 103946758 A | | 7/2014 |
| CN | 104422439 A | | 3/2015 |
| CN | 104575098 A | | 4/2015 |
| CN | 104980344 A | | 10/2015 |
| CN | 105160928 A | | 12/2015 |
| CN | 105261233 A | | 1/2016 |
| CN | 105303873 A | | 2/2016 |
| CN | 105427664 A | | 3/2016 |
| CN | 105469625 A | | 4/2016 |
| CN | 105513403 A | | 4/2016 |
| CN | 105513403 A | * | 4/2016 |
| DE | 10 2007 021 693 A1 | | 11/2008 |
| EP | 2 711 880 A1 | | 3/2014 |

* cited by examiner obtaining current position characteristic information and sending the current position characteristic information to a server, such that the server determines a position of an area matching the current position characteristic information based on the current position characteristic information and a locally stored database, and takes the determined position as an initial position; wherein the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area — S201 receiving target position characteristic information input by a user, and sending the target position characteristic information to the server, so that the server determines a position of an area matching the target position characteristic information based on the target position characteristic information and the database, takes the determined position as a target position and determines a route from the initial position to the target position — S202 receiving the route sent by the server, and displaying the route on an electronic map of the mobile terminal — S203 receiving the current position of the mobile terminal sent by the server, and displaying the current position on the electronic map of the mobile terminal — S204

Fig. 5

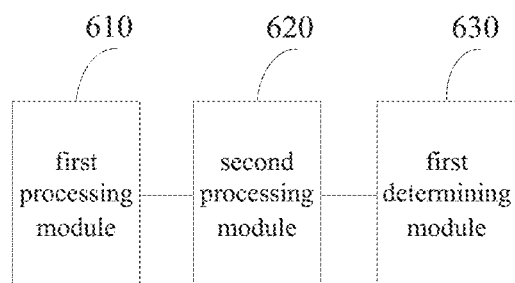

Fig. 6

NAVIGATION METHOD, DEVICE, AND SYSTEM

The present application claims the priority to a Chinese Patent Application No. 201610520497.9, filed with the State Intellectual Property Office of People's Republic of China on Jun. 29, 2016 and entitled "Navigation Method, Device, and System", which is incorporated herein by reference in its entirety.

TECHNICAL FIELD

The present application relates to the technical field of navigation, and particularly to a navigation method, device and system.

BACKGROUND

With the rapid growth of the economy, the number of the owned cars in the society is continuously increasing, the number of parking lots for cars also increases with it, and the scale thereof is continuously expanded. Large parking lots located in people flow, on one hand, meet people's needs of driving and safe parking of cars, and on the other hand, make users easily lost therein due to huge sites, complex building structures. For example, when users leave parking lots, they may not find their cars parked therein.

In a related parking space locating method, the identifier of a parking space where a user's car is located can be known by the user through a parking space camera installed in the parking lot. Specifically, the status of each parking space in the entire parking lot can be displayed on the user's terminal apparatus. Thus, users can find the parking spaces where their own cars are located and so on.

A parking space camera is a surveillance camera that is installed in front of each parking space so as to capture the status of each parking space. Specifically, it can be used to monitor whether there is a vehicle parked in each parking space, and when there is a vehicle parked in a parking space, it is possible to monitor the license plate of the parked vehicle thereon.

However, with the above parking space locating method, a user only can be informed of an identifier of a parking space he/she wants to find, instead of the way how to reach this parking space. But in a large parking lot, it is difficult for a user to find a parking space even he/she knows the identifier thereof. Thus, it becomes an urgent problem that how to provide users with accurate navigation information so as to enable them to quickly find parking spaces.

SUMMARY

An objective of embodiments of the present application is to provide a navigation method, device and system, so as to provide users with accurate navigation information and improve user experience. The specific technical solutions are as follows.

In a first aspect, embodiments of the present application provide a navigation method applied in a server and the method includes:

receiving current position characteristic information sent by a mobile terminal, and determining a position of an area matching the current position characteristic information based on the current position characteristic information and a locally stored database, and taking the determined position as an initial position; wherein, the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area;

receiving target position characteristic information sent by the mobile terminal, determining a position of an area matching the target position characteristic information based on the target position characteristic information and the database, and taking the determined position as a target position; and determining a first route from the initial position to the target position and displaying the first route on an electronic map of the mobile terminal.

Optionally, after displaying the first route on the electronic map of the mobile terminal, the method further includes:

detecting the current position of the mobile terminal, and displaying the current position on the electronic map of the mobile terminal.

Optionally, detecting the current position of the mobile terminal includes:

obtaining movement state of the mobile terminal according to an inertial sensor in the mobile terminal; and determining the current position of the mobile terminal based on the initial position and the movement state of the mobile terminal.

Optionally, after displaying the current position on the electronic map of the mobile terminal, the method further includes:

receiving, after a position correction instruction sent by the mobile terminal is received, the current position characteristic information sent by the mobile terminal, determining a position of an area matching the current position characteristic information based on the current position characteristic information and the database, and updating the current position of the mobile terminal with the determined position.

Optionally, detecting the current position of the mobile terminal includes:

receiving current position characteristic information periodically sent by the mobile terminal, determining the position of an area matching the current position characteristic information based on the current position characteristic information and the database, and taking the determined position as the current position.

Optionally, the method further includes:

detecting whether an offset between the current position and the first route is greater than a predetermined threshold; and if so, determining a second route from the current position to the target position according to the current position and the target position, and displaying the second route on the electronic map of the mobile terminal.

Optionally, identification information and position information corresponding to each of parking spaces, license plate numbers or images of currently parked vehicles are stored in the database; the current position characteristic information comprises at least one of parking space identification information, a license plate number or a comparison image; the target position characteristic information comprises at least one of parking space identification information, a license plate number or a comparison image.

Optionally, a characteristic image of each area is acquired by the image acquiring apparatus for this area after detecting a change of the content contained in this area.

In a second aspect, embodiments of the present application provide a navigation method applied in a mobile terminal and the method includes:

obtaining current position characteristic information and sending the current position characteristic information to a server, such that the server determines a position of an area matching the current position characteristic information based on the current position characteristic information and a locally stored database, and takes the determined position as an initial position; wherein the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area;

receiving target position characteristic information input by a user, and sending the target position characteristic information to the server, so that the server determines a position of an area matching the target position characteristic information based on the target position characteristic information and the database, takes the determined position as a target position and determines a route from the initial position to the target position; and receiving the route sent by the server, and displaying the route on an electronic map of the mobile terminal.

Optionally, after displaying the route on the electronic map, the method further includes:

receiving the current position of the mobile terminal sent by the server, and displaying the current position on the electronic map of the mobile terminal.

Optionally, obtaining current position characteristic information includes:

receiving current position characteristic information input by a user;

acquiring a characteristic image and taking the characteristic image as the current position characteristic information; or acquiring a characteristic image and extracting the current position characteristic information from the characteristic image, wherein the current position characteristic information comprises at least one of: an image containing a preset area in the characteristic image, and characters in the preset area.

Optionally, identification information and position information corresponding to each of parking spaces, license plate numbers or images of currently parked vehicles are stored in the database, the current position characteristic information comprises at least one of parking space identification information, a license plate number or a comparison image; the target position characteristic information comprises at least one of parking space identification information, a license plate number or a comparison image.

In a third aspect, embodiments of the present application provide a navigation device applied in a server and the device includes:

a first processing module, configured for receiving current position characteristic information sent by a mobile terminal, determining a position of an area matching the current position characteristic information based on the current position characteristic information and a locally stored database, and taking the determined position as an initial position; wherein the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area;

a second processing module, configured for receiving target position characteristic information sent by the mobile terminal, determining a position of an area matching the target position characteristic information based on the target position characteristic information and the database, and taking the determined position as a target position; and a first determining module, configured for determining a first route from the initial position to the target position and displaying the first route on an electronic map of the mobile terminal.

Optionally, the device further includes:

a detection module, configured for detecting the current position of the mobile terminal, and displaying the current position on the electronic map of the mobile terminal.

Optionally, the detection module includes:

an obtaining submodule, configured for obtaining movement state of the mobile terminal according to an inertial sensor in the mobile terminal; and a determining submodule, configured for determining the current position of the mobile terminal based on the initial position and the movement state of the mobile terminal.

Optionally, the device further includes:

a third processing module, configured for receiving, after a position correction instruction sent by the mobile terminal is received, the current position characteristic information sent by the mobile terminal, determining a position of an area matching the current position characteristic information based on the current position characteristic information and the database, and updating the current position of the mobile terminal with the determined position.

Optionally, the detection module is specifically configured for receiving current position characteristic information periodically sent by the mobile terminal, determining the position of an area matching the current position characteristic information based on the current position characteristic information and the database, and taking the determined position as the current position.

Optionally, the detection module is further configured for detecting whether an offset between the current position and the first route is greater than a predetermined threshold; the device further includes:

a fourth processing module, configured for, when the detection module detects that the offset between the current position and the first route is greater than the predetermined threshold, determining a second route from the current position to the target position according to the current position and the target position, and displaying the second route on the electronic map of the mobile terminal.

Optionally, identification information and position information corresponding to each of parking spaces, license plate numbers or images of currently parked vehicles are stored in the database; the current position characteristic information comprises at least one of parking space identification information, a license plate number or a comparison image; the target position characteristic information comprises at least one of parking space identification information, a license plate number or a comparison image.

Optionally, a characteristic image of each area is acquired by the image acquiring apparatus for this area after detecting a change of the content contained in this area.

In a fourth aspect, embodiments of the present application provide a navigation device applied in a mobile terminal and the device includes:

a first processing module, configured for obtaining current position characteristic information and sending the current position characteristic information to a server, such that the server determines a position of an area matching the current position characteristic information based on the current position characteristic information and a locally stored database and takes the determined position as an initial position; wherein the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area;

a second processing module, configured for receiving target position characteristic information input by a user, and sending the target position characteristic information to the server, so that the server determines a position of an area matching the target position characteristic information based on the target position characteristic information and the database, takes the determined position as a target position, and determines a route from the initial position to the target position; and a first receiving module, configured for receiving the route sent by the server, and displaying the route on an electronic map of the mobile terminal.

Optionally, the device further includes:

a second receiving module, configured for receiving current position of the mobile terminal sent by the server, and displaying the current position on the electronic map of the mobile terminal.

Optionally, the first processing module is specifically configured for receiving the current position characteristic information input by the user;

acquiring a characteristic image and taking the characteristic image as the current position characteristic information; or acquiring a characteristic image and extracting the current position characteristic information from the characteristic image, wherein the current position characteristic information comprises at least one of: an image containing a preset area in the characteristic image, and characters in the preset area.

Optionally, identification information and position information corresponding to each of parking spaces, license plate numbers or images of currently parked vehicles are stored in the database; the current position characteristic information comprises at least one of parking space identification information, a license plate number or a comparison image; the target position characteristic information comprises at least one of parking space identification information, a license plate number or a comparison image.

In a fifth aspect, embodiments of the present application provide a navigation system, which includes image acquiring apparatuses installed at respective areas, a server and a mobile terminal;

the image acquiring apparatus is configured for acquiring characteristic images of the respective areas;

the server is configured for performing the navigation method described above in the first aspect; and the mobile terminal is configured for performing the navigation method described above in the second aspect.

In a sixth aspect, embodiments of the present application provide a navigation system, which includes image acquiring apparatuses installed at respective areas, the navigation device in a server described above in the third aspect, and the navigation device in a mobile terminal described above in the fourth aspect.

In a seventh aspect, the present application provides a storage medium, wherein the storage medium is used for storing executable program codes which are executed to implement the navigation method described above in the first aspect.

In an eighth aspect, the present application provides a storage medium, wherein the storage medium is used for storing executable program codes which are executed to implement the navigation method described above in the second aspect.

In a ninth aspect, the present application provides an application program, wherein the application program is used for implementing the navigation method described above in the first aspect.

In a tenth aspect, the present application provides an application program, wherein the application program is used for implementing the navigation method described above in the second aspect.

In a eleventh aspect, the present application provides an electronic apparatus, including:
a processor, a memory, communication interfaces and a bus;
the processor, the memory and the communication interfaces are connected and communicated with each other via the bus;
the memory stores executable program codes;
the processor executes a program corresponding to the executable program codes by reading the executable program codes stored in the memory, so as to implement the navigation method described above in the first aspect.

In a twelfth aspect, the present application provides an electronic apparatus, including: a processor, a memory, communication interfaces and a bus;
the processor, the memory and the communication interfaces are connected and communicated with each other via the bus;
the memory stores executable program codes;
the processor executes a program corresponding to the executable program codes by reading the executable program codes stored in the memory, so as to implement the navigation method described above in the second aspect.

Embodiments of the present application provide a navigation method, device and system, wherein a server can exactly determine an initial position based on the current position characteristic information sent by a mobile terminal and a locally stored database, and exactly determine a target position based on the target position characteristic information sent by the mobile terminal and the locally stored database, and thus determine a route from the initial position to the target position and display this route on an electronic map of the mobile terminal. As a result, the method can provide users with accurate navigation information and improve user experience.

BRIEF DESCRIPTION OF THE DRAWINGS

In order to describe the embodiments of the present application and the technical solutions in the prior art more clearly, drawings required for embodiments of the present application and the prior art will be described briefly below. It is obvious that the drawings below are for only some embodiments of the present application, and those skilled in the art can also obtain further drawings based on these drawings without any creative efforts.

FIG. 5 is another flowchart of a navigation method provided by an embodiment of the present application;

FIG. 6 is a schematic structural diagram of a navigation device provided by an embodiment of the present application;

DETAILED DESCRIPTION

For a better understanding of the technical solution in the embodiments of the present application by a person skilled in the art, the technical solutions in the embodiments of the present application will be described clearly and completely below with reference to the accompanying drawings in the embodiments of the present application. Obviously, the described embodiments are only some of the embodiments of the present application, rather than all of the embodiments. All other embodiments obtained based on the embodiments of the present application by those skilled in the art without any creative work fall into the protection scope defined by the present application.

It should be noted that, in the absence of conflict, embodiments in the present application and features in the embodiments can be combined with each other. The present application will be described in detail below with reference to the drawings and with embodiments.

In embodiments of the present application, a database can be constructed in advance in order to provide users with accurate navigation information and to improve user experience, wherein, the database can be constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area.

For example, when it is intended to provide users with navigation information within a parking area, identification information and position information on each parking space within a parking lot, as well as the characteristic information on each parking space can be stored in the database. Wherein, when a parking space is currently idle, the characteristic information thereof is idle; when a parking space is currently not idle, the characteristic information thereof is information on the vehicle currently parked on this parking space, such as the license plate number and vehicle images etc.

The database stored in a server can be shown as in the following table:

| identification information | position information | characteristic information |
|---|---|---|
| 1 | x1, y1 | idle |
| 2 | x2, y2 | Jing Nxxx |
| 3 | x3, y3 | Jin Axxx |
| ... | ... | ... |
| N | xn, yn | idle |

Wherein, when an area is not idle, the corresponding characteristic information can be stored in the form of words or images.

Figure 1:
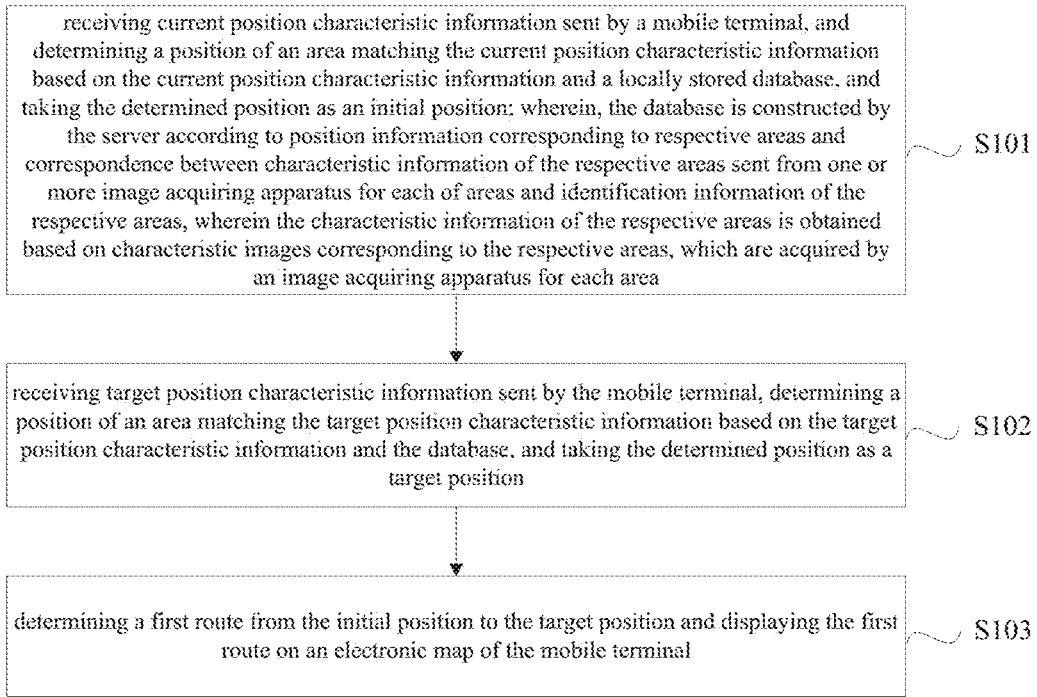
FIG. 1 is a flowchart of a navigation method provided by an embodiment of the present application.

In order to provide users with accurate navigation information and to improve user experience, embodiments of the present invention provide a navigation method applicable to a server, as shown in FIG. 1, which can include:

S101, receiving current position characteristic information sent by a mobile terminal, and determining a position of an area matching the current position characteristic information based on the current position characteristic information and a locally stored database, and taking the determined position as an initial position; wherein, the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area.

In embodiments of the present application, a user, when entering a parking lot, can use a mobile terminal he/she carries to obtain navigation information through a corresponding server of this parking lot.

Specifically, a user can input current position characteristic information through a mobile terminal, and then the mobile terminal can send the current position characteristic information to a server, such that the server determines the position of an area matching the current position characteristic information based on the current position characteristic information and a locally stored database and takes the determined position as an initial position.

Wherein, the current position characteristic information input by a user through a mobile terminal at least includes at least one of the following: an identifier of a parking space, a license plate number or a comparison image.

For example, a user, when entering a parking lot, can take an identifier of the parking space where he/she is currently located as current position characteristic information and input it into a mobile terminal; or when there is a vehicle parked in the position where he/she is currently located, can input the license plate number of this vehicle as current position characteristic information; or can take a characteristic image in the position where he/she is currently located using the camera function of a mobile terminal and obtain current position characteristic information based on this characteristic image.

When a mobile terminal collects a characteristic image, it can directly send this characteristic image to a server as current position characteristic information. Alternatively, it can extract characteristic information from the collected characteristic image and send this characteristic information to a server as current position characteristic information. Wherein, when a mobile terminal extracts characteristic information in a characteristic image, the extracted characteristic information can be an image or a word.

For example, a mobile terminal can identify characteristic information, such as an identifier of a parking space and a license plate number, in a characteristic image using any one of the existing image analysis methods, and send the extracted characteristic information to a server in the form of words as current position characteristic information. Alternatively, when characteristic information, such as an identifier of a parking space and a license plate number, in a characteristic image is identified by a mobile terminal, the mobile terminal can obtain an image of the area containing the characteristic information and send this image to a server as current position characteristic information.

The procedure of extracting characteristic information by a mobile terminal from a characteristic image can be accomplished using any one of the existing methods, and will not be repeatedly described in embodiments of the present application.

When a user input current position characteristic information to a mobile terminal, the mobile terminal can further send the current position characteristic information to a server. The server, after receiving current position characteristic information sent by the mobile terminal, can search a locally stored database for the position of an area matching the current position characteristic information. Since the initial position characteristic information input by a user is information obtained at the current position thereof, the position determined by a server is the current position of the user, i.e., the initial position for determining navigation route.

For example, when a user inputs an identifier of a parking space, the server can search the database for the position where the parking space with this identifier is located and take this position as an initial position. When a user inputs a license plate number, the server can find the position where the car with this license plate number is parked and take the position as the initial position.

S102, receiving target position characteristic information sent by the mobile terminal, determining a position of an area matching the target position characteristic information based on the target position characteristic information and the database, and taking the determined position as a target position.

The server can further determine the target position after determining the initial position. Specifically, the target position can be an idle parking space, or the position where a user's car is parked, which depends on different requirements.

When a user wants to find a vehicle that he/she has parked, the target position is the position where the car is parked. In this case, the target position characteristic information can be input by a user through a mobile terminal and at least includes at least one of the following: an identifier of a parking space, a license plate number or a comparison image.

For example, when a user wants to find a vehicle that he/she has parked, he/she can input the license plate number or image of the vehicle, alternatively, when a user remembers the identifier of the parking space while parking, he/she can input the identifier of the parking space as target position characteristic information.

When a user input target position characteristic information to a mobile terminal, the mobile terminal can further send the target position characteristic information to a server. The server, after receiving target position characteristic information sent by the mobile terminal, can search a locally stored database for the position of an area matching the target position characteristic information and take the found position as a target position.

When a user wants to park a car, in one implementation, a server can determine the positions of all of the currently idle areas based on a correspondence, stored in the database, between various characteristic information and identification information on various areas as well as position information corresponding to the various areas, and determine the position of one of the idle areas as a target position.

In another implementation, in order to improve user experience, a server can display all idle areas on an electronic map of a mobile terminal based on a correspondence, stored in the database, between various characteristic information and identification information on various areas as well as position information corresponding to the various areas, and it is up to a user to choose one of the idle areas as a target position. For example, the user can choose the position closer to himself/herself through a mobile terminal, which will send the position to a server, and the server can directly take this position as a target position.

It should be noted that, when a server displays all idle areas on an electronic map, it is possible only to display idle areas. Alternatively, in order to enable a user to know the parking condition of the entire parking lot, it is also possible to display non-idle areas on an electronic map, and denote idle areas and non-idle areas respectively. Further, a user can choose one of idle areas, and take this position as a target position.

S103, determining a first route from the initial position to the target position and displaying the first route on an electronic map of the mobile terminal.

After the determination of the initial position and the target position, a server can determine a first route from the initial position to the target position. For example, a server can determine the closest route among various routes from the initial position and the target position as the first route based on the route distribution within this parking lot.

The procedure of determining the first route from the initial position to the target position by a server can be accomplished using any existing technology, and will not be repeatedly described in embodiments of the present application.

After determining the first route from the initial position to the target position, the server can send the first route to a mobile terminal and displays the first route on an electronic map of the mobile terminal.

For example, the server can display an electronic map of a parking lot on a mobile terminal and display the determined first route on the electronic map.

Embodiments of the present application provide a navigation method, in which a server can exactly determine an initial position based on the current position characteristic information sent by a mobile terminal and a locally stored database, and exactly determine a target position based on the target position characteristic information sent by the mobile terminal and the locally stored database, and thus determine a route from the initial position to the target position and display this route on an electronic map of the mobile terminal. As a result, the method can provide users with accurate navigation information and improve user experience.

In one implementation of the present application, in order to enable a server to construct an accurate database, it is possible to provide a corresponding image acquiring apparatus for each area. The image acquiring apparatus can collect characteristic images of a corresponding area, obtain the corresponding characteristic information based on various characteristic images and send the same to the server. Further, the server can construct a database based on a correspondence between various characteristic information and various areas as well as positions of various areas.

For example, a corresponding image acquiring apparatus can be provided at each area, alternatively, when the range of an area is small and the image acquiring area of one image acquiring apparatus may include a plurality of areas, it is possible to provide one image acquiring apparatus for a plurality of areas. Each image acquiring apparatus can collect characteristic images of a corresponding area periodically according to the set time interval, obtain the corresponding characteristic information based on characteristic images and send the same to the server.

In one implementation, an image acquiring apparatus can directly send the collected characteristic image as characteristic information. In another implementation, an image acquiring apparatus can extract characteristic information from the collected characteristic image and send the extracted characteristic information to the server.

For example, an image acquiring apparatus can identify characteristic information, such as an identifier of a parking space and a license plate number, in a characteristic image using any one of the existing image analysis methods, and send the extracted characteristic information to a server in the form of words as current position characteristic information. Alternatively, when characteristic information, such as an identifier of a parking space and a license plate number, in a characteristic image is identified by a mobile terminal, the mobile terminal can obtain an image of the area containing the characteristic information and send this image to a server as current position characteristic information.

The procedure of extracting characteristic information by an image acquiring apparatus from a characteristic image can be accomplished using any one of the existing methods, and will not be repeatedly described in embodiments of the present application.

Optionally, in order to avoid the overloads of various image acquiring apparatuses due to periodical collection of characteristic images, each image acquiring apparatus can detect whether there is a change of the content contained in the corresponding area. For example, it can detect whether the corresponding area is changed from an idle state to a state in which there is a vehicle parked there; alternatively, it can detect whether the vehicle parked in the corresponding area has changed.

When the image acquiring apparatus detects that the content contained in the corresponding area has changed, it can collect characteristic image of this area. That is to say, the image acquiring apparatus can collect characteristic images corresponding to the changed area, and thus the loads of various image acquiring apparatuses are reduced and meanwhile the accuracy of the database stored in a server is ensured.

Figure 2:
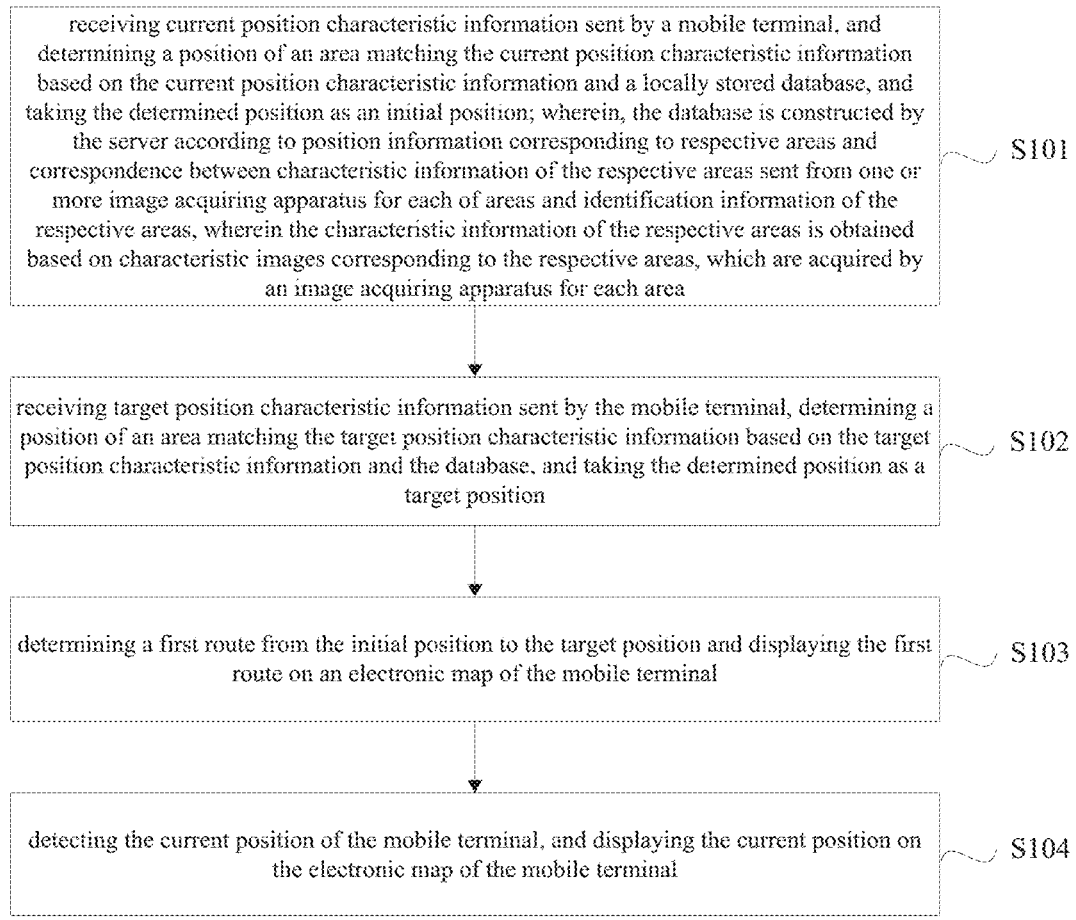
FIG. 2 is another flowchart of a navigation method provided by an embodiment of the present application.

In one implementation of the present application, as shown in FIG. 2, after S103, the navigation method provided by the present application can further include:

S104, detecting the current position of the mobile terminal, and displaying the current position on the electronic map of the mobile terminal.

In embodiments of the present application, when a server determines the first route from the initial position to the target position and displays the first route on an electronic map of a mobile terminal, it can further detect the current position of the mobile terminal and display the current position on the electronic map of the mobile terminal.

In one implementation, a server can obtain the movement state, e.g. acceleration and angular acceleration, of a mobile terminal through an inertial sensor (e.g., an accelerometer and a gyroscope) in the mobile terminal; and further determine the current position of the mobile terminal based on the initial position previously obtained and the movement state.

When a server determines the current position of a mobile terminal through an inertial sensor in the mobile terminal, the determined position may be not accurate in some cases.

Thus, in embodiments of the present application, a user can determine whether the current position displayed on a mobile terminal is right based on the current position displayed on the mobile terminal as well as the actual position where he/she is located. When the user determines that the current position displayed on the mobile terminal is largely different from his/her actual position, he/she can make position correction.

Specifically, the user can input a position correction instruction to the mobile terminal, and when the mobile terminal receives the position correction instruction sent by the user, the mobile terminal can send the position correction instruction to the server. Further, the user can input current position characteristic information through the mobile terminal again, and then the mobile terminal can send the current position characteristic information to a server, such that the server determines the position of an area matching the current position characteristic information based on the current position characteristic information and a locally stored database and takes the determined position as the current position of the mobile terminal.

The procedures of a user inputting current position characteristic information through a mobile terminal and of a server determining the position of an area matching the current position characteristic information based on the current position characteristic information and a locally stored database are similar with the procedure of determining the initial position described above, and will not be repeatedly described in embodiments of the present application.

In another implementation, in order to improve the accuracy of the determined current position, the server can receive current position characteristic information periodically sent by the mobile terminal, determine the position of an area matching the current position characteristic information based on the current position characteristic information and the locally stored database, take the determined position as the current position, and display this current position on the electronic map of the mobile terminal.

The procedure of determining the current position of a mobile terminal by a server can be accomplished using any one of the existing methods, and will not be repeatedly described in embodiments of the present application.

By detecting the current position of a mobile terminal and displaying this current position on an electronic map of the mobile terminal, a user can be informed of his/her own real time position, so as to determine whether his/her route is right.

Figure 3:
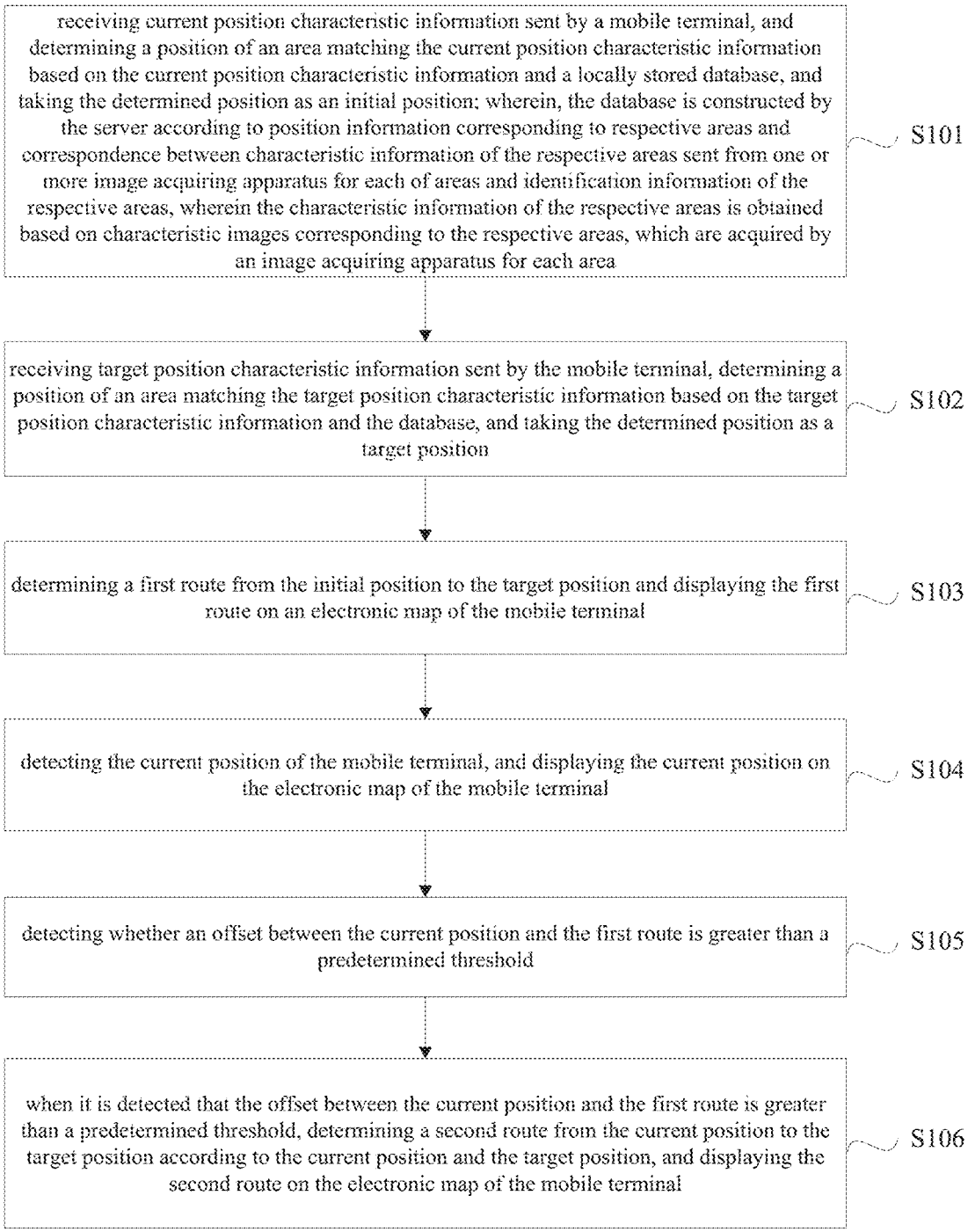
FIG. 3 is another flowchart of a navigation method provided by an embodiment of the present application.

In one implementation of the present application, as shown in FIG. 3, after S104, the navigation method provided by the present application can further include:

S105, detecting whether an offset between the current position and the first route is greater than a predetermined threshold.

In some cases, when the server displays the first route on the mobile terminal, the user's route still may be offset from this first route.

In embodiments of the present application, the server can detect whether the offset of the current position of a mobile terminal and the first route is greater than a predetermined threshold, such as 3, 5, 10 meters.

Specifically, a user can determine whether the minimum distance between the current position of a mobile terminal and the first route is greater than a predetermined threshold based on the first route and the current position of the mobile terminal, if so, it is determined that the offset between the current position and the first route is greater than a predetermined threshold.

S106, when it is detected that the offset between the current position and the first route is greater than a predetermined threshold, determining a second route from the current position to the target position according to the current position and the target position, and displaying the second route on the electronic map of the mobile terminal.

When determining that the offset between the current position of the mobile terminal and the first route is greater than a predetermined threshold, the server can determines, according to the current position and the target position, the second route from the current position to the target position, and displaying the second route on the electronic map of the mobile terminal.

The procedure of determining the second route from the current position to the target position by a server can be accomplished using any existing technology, and will not be repeatedly described in embodiments of the present application.

In the present solution, when a server determines that the offset between the current position of a mobile terminal and the first route is greater than a predetermined threshold, it can redesign a route based on the current position of the mobile terminal and the target position, thus it can be ensured that the user can smoothly reach the target position, improving user experience.

Figure 4:
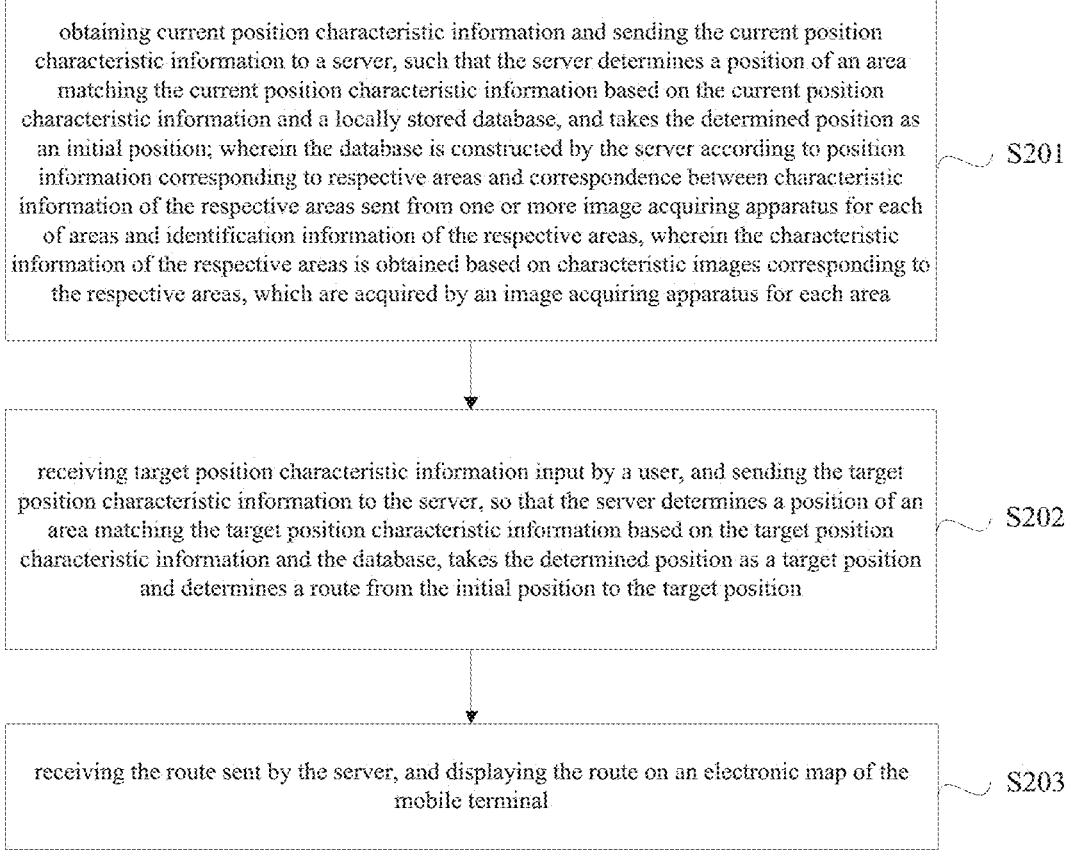
FIG. 4 is another flowchart of a navigation method provided by an embodiment of the present application.

In order to provide users with accurate navigation information and to improve user experience, embodiments of the present invention provide a navigation method applicable to a mobile terminal, as shown in FIG. 4, which can include:

S201, obtaining current position characteristic information and sending the current position characteristic information to a server, such that the server determines a position of an area matching the current position characteristic information based on the current position characteristic information and a locally stored database, and takes the determined position as an initial position; wherein the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area.

In embodiments of the present application, a user, when entering a parking lot, can use a mobile terminal he/she carries to obtain current position characteristic information. Further, the mobile terminal can send the current position characteristic information to a server, such that the server determines the position of an area matching the current position characteristic information based on the current position characteristic information and a locally stored database and takes the determined position as an initial position.

Wherein, the current position characteristic information obtained by a mobile terminal at least includes at least one of the following: an identifier of a parking space, a license plate number or a comparison image;

For example, a user, when entering a parking lot, can take an identifier of the parking space where he/she is currently located as current position characteristic information and input it into a mobile terminal; or when there is a vehicle parked in the position where he/she is currently located, can input the license plate number of this vehicle as current position characteristic information; or can take a characteristic image in the position where he/she is currently located using the camera function of a mobile terminal and obtain current position characteristic information based on this characteristic image.

When a mobile terminal collects a characteristic image, it can directly send this characteristic image to a server as current position characteristic information. Alternatively, it can extract characteristic information from the collected characteristic image and send this characteristic information to a server as current position characteristic information. Wherein, when a mobile terminal extracts characteristic information in a characteristic image, the extracted characteristic information can be an image or a word.

For example, a mobile terminal can identify characteristic information, such as an identifier of a parking space and a license plate number, in a characteristic image using any one of the existing image analysis methods, and send the extracted characteristic information to a server in the form of words as current position characteristic information. Alternatively, when characteristic information, such as an identifier of a parking space and a license plate number, in a characteristic image is identified by a mobile terminal, the mobile terminal can obtain an image of the area containing the characteristic information and send this image to a server as current position characteristic information.

The procedure of extracting characteristic information by a mobile terminal from a characteristic image can be accomplished using any one of the existing methods, and will not be repeatedly described in embodiments of the present application.

When a user input current position characteristic information to a mobile terminal, the mobile terminal can further send the current position characteristic information to a server. The server, after receiving current position characteristic information sent by the mobile terminal, can search a locally stored database for the position of an area matching the current position characteristic information. Since the initial position characteristic information input by a user is information obtained at the current position thereof, the position determined by a server is the current position of the user, i.e., the initial position for determining navigation route.

For example, when a user inputs an identifier of a parking space, the server can search the database for the position where the parking space with this identifier is located and take this position as an initial position. When a user inputs a license plate number, the server can find the position where the car with this license plate number is parked and take the position as the initial position.

S202, receiving target position characteristic information input by a user, and sending the target position characteristic information to the server, so that the server determines a position of an area matching the target position characteristic information based on the target position characteristic information and the database, takes the determined position as a target position and determines a route from the initial position to the target position.

In embodiments of the present application, the server can further determine the target position after determining the initial position. Specifically, the target position can be an idle parking space, or the position where a user's car is parked, which depends on different requirements.

When a user wants to find a vehicle that he/she has parked, the target position is the position where the car is parked. In this case, the target position characteristic information can be input by a user through a mobile terminal and at least includes at least one of the following: an identifier of a parking space, a license plate number or a comparison image.

For example, when a user wants to find a vehicle that he/she has parked, he/she can input the license plate number or image of the vehicle, alternatively, when a user remembers the identifier of the parking space while parking, he/she can input the identifier of the parking space as target position characteristic information.

When a user input target position characteristic information to a mobile terminal, the mobile terminal can further send the target position characteristic information to a server. The server, after receiving target position characteristic information sent by the mobile terminal, can search a locally stored database for the position of an area matching the target position characteristic information and take the found position as a target position.

When a user wants to park a car, in one implementation, a server can determine the positions of all of the currently idle areas based on a correspondence, stored in the database, between various characteristic information and identification information on various areas as well as position information corresponding to the various areas, and determine the position of one of the idle areas as a target position.

In another implementation, in order to improve user experience, a server can display all idle areas on an electronic map of a mobile terminal based on a correspondence, stored in the database, between various characteristic information and identification information on various areas as well as position information corresponding to the various areas, and it is up to a user to choose one of the idle areas as a target position. For example, the user can choose the position closer to himself/herself through a mobile terminal, which will send the position to a server, and the server can directly take this position as a target position.

It should be noted that, when a server displays all idle areas on an electronic map, it is possible only to display idle areas. Alternatively, in order to enable a user to know the parking condition of the entire parking lot, it is also possible to display non-idle areas on an electronic map, and denote idle areas and non-idle areas respectively. Further, a user can choose one of idle areas, and take this position as a target position.

After the determination of the target position and the initial position, the server can determine a route from the initial position to the target position. The procedure of determining the route from the initial position to the target position by a server can be accomplished using any existing technology, and will not be repeatedly described in embodiments of the present application.

S203, receiving the route sent by the server, and displaying the route on an electronic map of the mobile terminal.

After the route from the initial position to the target position is determined, the server can send the route to the mobile terminal. Thus, in embodiments of the present application, the mobile terminal can receive the route sent by the server and display this route on its electronic map.

Embodiments of the present application provide a navigation method, in which a server can exactly determine an initial position based on the current position characteristic information sent by a mobile terminal and a locally stored database, and exactly determine a target position based on the target position characteristic information sent by the mobile terminal and the locally stored database, and thus determine a route from the initial position to the target position and display this route on an electronic map of the mobile terminal. As a result, the method can provide users with accurate navigation information and improve user experience.

In one implementation of the present application, as shown in FIG. 5, after S203, the navigation method provided by the present application can further include:

S204, receiving the current position of the mobile terminal sent by the server, and displaying the current position on the electronic map of the mobile terminal.

In embodiments of the present application, when a server determines the route from the initial position to the target position and displays the route on an electronic map of a mobile terminal, it can further detect the current position of the mobile terminal and send this current position to the mobile terminal.

In one implementation, a server can obtain the movement state, e.g. acceleration and angular acceleration, of a mobile terminal through an inertial sensor (e.g., an accelerometer and a gyroscope) in the mobile terminal; and further determine the current position of the mobile terminal based on the initial position previously obtained and the movement state.

When a server determines the current position of a mobile terminal through an inertial sensor in the mobile terminal, the determined position may be not accurate in some cases.

Thus, in embodiments of the present application, a user can determine whether the current position displayed on a mobile terminal is right based on the current position displayed on the mobile terminal as well as the actual position where he/she is located. When the user determines that the current position displayed on the mobile terminal is largely different from his/her actual position, he/she can make position correction.

Specifically, the user can input a position correction instruction to the mobile terminal, when the mobile terminal receives the position correction instruction sent by the user, it can send the position correction instruction to the server. Further, the user can input current position characteristic information through the mobile terminal again, and then the mobile terminal can send the current position characteristic information to a server, such that the server determines the position of an area matching the current position characteristic information based on the current position characteristic information and a locally stored database and takes the determined position as the current position of the mobile terminal.

The procedures of a user inputting current position characteristic information through a mobile terminal and of a server determining the position of an area matching the current position characteristic information based on the current position characteristic information and a locally stored database are similar with the procedure of determining the initial position described above, and will not be repeatedly described in embodiments of the present application.

In another implementation, in order to improve the accuracy of the determined current position, the server can receive current position characteristic information periodically sent by the mobile terminal, determine the position of an area matching the current position characteristic information based on the current position characteristic information and the locally stored database, take the determined position as the current position, and display this current position on the electronic map of the mobile terminal.

The procedure of determining the current position of a mobile terminal by a server can be accomplished using any one of the existing methods, and will not be repeatedly described in embodiments of the present application.

Thus, the mobile terminal can receive the current position sent by the server and display this current position on its electronic map.

By detecting the current position of a mobile terminal and displaying this current position on an electronic map of the mobile terminal, a user can be informed of his/her own real-time position, so as to determine whether his/her route is right.

Corresponding to the above embodiments of the method, the embodiments of the present application further provide corresponding embodiments of a device.

FIG. 6 is a navigation device provided by embodiments of the present application, which is applicable to a server, the device includes:

a first processing module 610, configured for receiving current position characteristic information sent by a mobile terminal, determining a position of an area matching the current position characteristic information based on the current position characteristic information and a locally stored database, and taking the determined position as an initial position; wherein the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area;

a second processing module 620, configured for receiving target position characteristic information sent by the mobile terminal, determining a position of an area matching the target position characteristic information based on the target position characteristic information and the database, and taking the determined position as a target position; and a first determining module 630, configured for determining a first route from the initial position to the target position and displaying the first route on an electronic map of the mobile terminal.

Embodiments of the present application provide a navigation device, in which a server can exactly determine an initial position based on the current position characteristic information sent by a mobile terminal and a locally stored database, and exactly determine a target position based on the target position characteristic information sent by the mobile terminal and the locally stored database, and thus determine a route from the initial position to the target position and display this route on an electronic map of the mobile terminal. As a result, the method can provide users with accurate navigation information and improve user experience.

Figure 7:
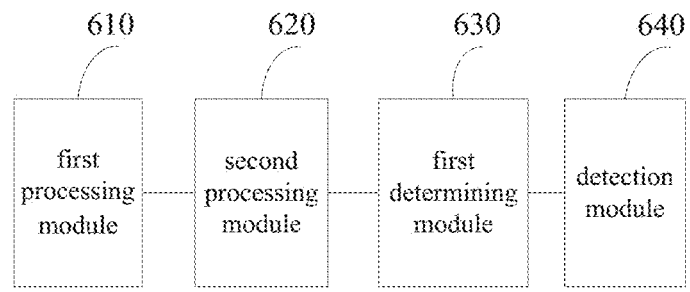
FIG. 7 is another schematic structural diagram of a navigation device provided by an embodiment of the present application.

In one implementation of the present application, as shown in FIG. 7, the device further includes:

a detection module 640, configured for detecting the current position of the mobile terminal, and displaying the current position on the electronic map of the mobile terminal.

In one implementation of the present application, the detection module 640 includes:

an obtaining submodule (not shown in the figure), configured for obtaining movement state of the mobile terminal according to an inertial sensor in the mobile terminal; and a determining submodule (not shown in the figure), configured for determining the current position of the mobile terminal based on the initial position and the movement state of the mobile terminal.

In one implementation of the present application, the device further includes:

a third processing module (not shown in the figure), configured for receiving, after a position correction instruction sent by the mobile terminal is received, the current position characteristic information sent by the mobile terminal, determining a position of an area matching the current position characteristic information based on the current position characteristic information and the database, and updating the current position of the mobile terminal with the determined position.

In one implementation of the present application, the detection module 640 is specifically configured for receiving current position characteristic information periodically sent by the mobile terminal, determining the position of an area matching the current position characteristic information based on the current position characteristic information and the database, and taking the determined position as the current position.

In one implementation of the present application, the detection module 640 is further configured for detecting whether an offset between the current position and the first route is greater than a predetermined threshold, the device further includes:

a fourth processing module (not shown in the figure), configured for, when the detection module detects that the offset between the current position and the first route is greater than the predetermined threshold, determining a second route from the current position to the target position according to the current position and the target position, and displaying the second route on the electronic map of the mobile terminal.

In one implementation of the present application, a characteristic image of each area is acquired by the image acquiring apparatus for this area after detecting a change of the content contained in this area.

Figure 8:
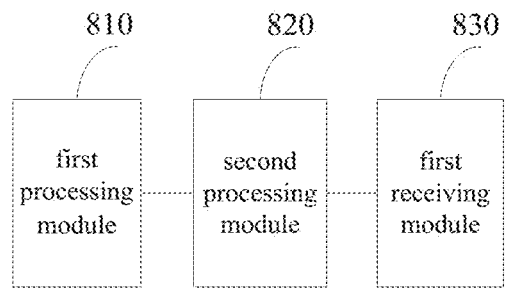
FIG. 8 is another schematic structural diagram of a navigation device provided by an embodiment of the present application.

FIG. 8 is a navigation device provided by the present application, which is applicable in a mobile terminal, the device includes:

a first processing module 810, configured for obtaining current position characteristic information and sending the current position characteristic information to a server, such that the server determines a position of an area matching the current position characteristic information based on the current position characteristic information and a locally stored database and takes the determined position as an initial position; wherein the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area;

a second processing module 820, configured for receiving target position characteristic information input by a user, and sending the target position characteristic information to the server, so that the server determines a position of an area matching the target position characteristic information based on the target position characteristic information and the database, takes the determined position as a target position, and determines a route from the initial position to the target position; and a first receiving module 830, configured for receiving the route sent by the server, and displaying the route on an electronic map of the mobile terminal.

Embodiments of the present application provide a navigation device, in which a server can exactly determine an initial position based on the current position characteristic information sent by a mobile terminal and a locally stored database, and exactly determine a target position based on the target position characteristic information sent by the mobile terminal and the locally stored database, and thus determine a route from the initial position to the target position.

and display this route on an electronic map of the mobile terminal. As a result, the method can provide users with accurate navigation information and improve user experience.

Figure 9:
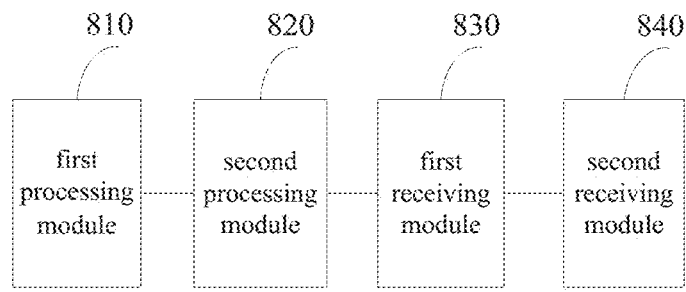
FIG. 9 is another schematic structural diagram of a navigation device provided by an embodiment of the present application.

In one implementation of the present application, as shown in FIG. 9, the device further includes:

a second receiving module 840, configured for receiving current position of the mobile terminal sent by the server, and displaying the current position on the electronic map of the mobile terminal.

In one implementation of the present application, the first processing module 810 is specifically configured for receiving the current position characteristic information input by the user;

acquiring a characteristic image and taking the characteristic image as the current position characteristic information; or acquiring a characteristic image and extracting the current position characteristic information from the characteristic image, wherein the current position characteristic information comprises at least one of: an image containing a preset area in the characteristic image, and characters in the preset area.

In one implementation of the present application, identification information and position information corresponding to each of parking spaces, license plate numbers or images of currently parked vehicles are stored in the database; the current position characteristic information comprises at least one of parking space identification information, a license plate number or a comparison image; the target position characteristic information comprises at least one of parking space identification information, a license plate number or a comparison image.

Figure 10:
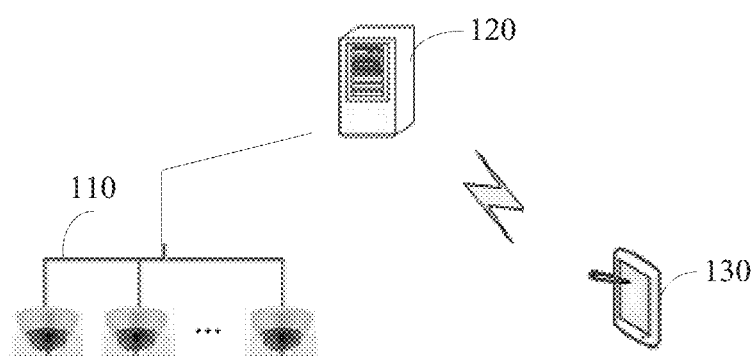
FIG. 10 is a schematic structural diagram of a navigation system provided by an embodiment of the present application.

FIG. 10 is a navigation system provided by embodiments of the present application, which includes image acquiring apparatuses 110 installed at respective areas, the navigation device in a server 120 as shown in FIGS. 7 to 8, the navigation device in a mobile terminal 130 as shown in FIG. 9.

Embodiments of the present application provide a navigation system, in which a server can exactly determine an initial position based on the current position characteristic information sent by a mobile terminal and a locally stored database, and exactly determine a target position based on the target position characteristic information sent by the mobile terminal and the locally stored database, and thus determine a route from the initial position to the target position and display this route on an electronic map of the mobile terminal. As a result, the method can provide users with accurate navigation information and improve user experience.

Embodiments of the present application provide a navigation system, which includes image acquiring apparatuses installed at respective areas, a server and a mobile terminal;

the image acquiring apparatuses are configured for acquiring characteristic images of the respective areas;

the server is configured for performing the navigation method as shown in FIGS. 1 to 3;

the mobile terminal is configured for performing the navigation method as shown in FIGS. 4 to 5.

Embodiments of the present application provide a navigation system, in which a server can exactly determine an initial position based on the current position characteristic information sent by a mobile terminal and a locally stored database, and exactly determine a target position based on the target position characteristic information sent by the mobile terminal and the locally stored database, and thus determine a route from the initial position to the target position and display this route on an electronic map of the mobile terminal. As a result, the method can provide users with accurate navigation information and improve user experience.

Correspondingly, the present application further provides a storage medium, wherein the storage medium is used for storing executable program codes which are executed to implement the navigation method provided by the present application. Wherein, the navigation method in the present application includes:

receiving current position characteristic information sent by a mobile terminal, and determining a position of an area matching the current position characteristic information based on the current position characteristic information and a locally stored database, and taking the determined position as an initial position;

wherein, the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area;

receiving target position characteristic information sent by the mobile terminal, determining a position of an area matching the target position characteristic information based on the target position characteristic information and the database, and taking the determined position as a target position; and determining a first route from the initial position to the target position and displaying the first route on an electronic map of the mobile terminal.

In embodiments of the present application, a server can exactly determine an initial position based on the current position characteristic information sent by a mobile terminal and a locally stored database, and exactly determine a target position based on the target position characteristic information sent by the mobile terminal and the locally stored database, and thus determine a route from the initial position to the target position and display this route on an electronic map of the mobile terminal. As a result, the method can provide users with accurate navigation information and improve user experience.

Correspondingly, the present application further provides a storage medium, wherein the storage medium is used for storing executable program codes which are executed to implement the navigation method provided by the present application. Wherein, the navigation method in the present application includes:

obtaining current position characteristic information and sending the current position characteristic information to a server, such that the server determines a position of an area matching the current position characteristic information based on the current position characteristic information and a locally stored database, and takes the determined position as an initial position; wherein the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area;

receiving target position characteristic information input by a user, and sending the target position characteristic information to the server, so that the server determines a position of an area matching the target position characteristic information based on the target position characteristic information and the database, takes the determined position as a target position and determines a route from the initial position to the target position; and receiving the route sent by the server, and displaying the route on an electronic map of the mobile terminal.

In embodiments of the present application, a server can exactly determine an initial position based on the current position characteristic information sent by a mobile terminal and a locally stored database, and exactly determine a target position based on the target position characteristic information sent by the mobile terminal and the locally stored database, and thus determine a route from the initial position to the target position and display this route on an electronic map of the mobile terminal. As a result, the method can provide users with accurate navigation information and improve user experience.

Correspondingly, the present application further provides an application program, wherein the application program is used for implementing the navigation method provided by the present application. Wherein, the navigation method in the present application includes:

receiving current position characteristic information sent by a mobile terminal, and determining a position of an area matching the current position characteristic information based on the current position characteristic information and a locally stored database, and taking the determined position as an initial position;

wherein, the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area;

receiving target position characteristic information sent by the mobile terminal, determining a position of an area matching the target position characteristic information based on the target position characteristic information and the database, and taking the determined position as a target position; and determining a first route from the initial position to the target position and displaying the first route on an electronic map of the mobile terminal.

In embodiments of the present application, a server can exactly determine an initial position based on the current position characteristic information sent by a mobile terminal and a locally stored database, and exactly determine a target position based on the target position characteristic information sent by the mobile terminal and the locally stored database, and thus determine a route from the initial position to the target position and display this route on an electronic map of the mobile terminal. As a result, the method can provide users with accurate navigation information and improve user experience.

Correspondingly, the present application further provides an application program, wherein the application program is used for implementing the navigation method provided by the present application. Wherein, the navigation method in the present application includes:

obtaining current position characteristic information and sending the current position characteristic information to a server, such that the server determines a position of an area matching the current position characteristic information based on the current position characteristic information and a locally stored database, and takes the determined position as an initial position; wherein the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area;

receiving target position characteristic information input by a user, and sending the target position characteristic information to the server, so that the server determines a position of an area matching the target position characteristic information based on the target position characteristic information and the database, takes the determined position as a target position and determines a route from the initial position to the target position; and receiving the route sent by the server, and displaying the route on an electronic map of the mobile terminal.

In embodiments of the present application, a server can exactly determine an initial position based on the current position characteristic information sent by a mobile terminal and a locally stored database, and exactly determine a target position based on the target position characteristic information sent by the mobile terminal and the locally stored database, and thus determine a route from the initial position to the target position and display this route on an electronic map of the mobile terminal. As a result, the method can provide users with accurate navigation information and improve user experience.

Correspondingly, the present application provides an electronic apparatus, including:

a processor, a memory, communication interfaces and a bus;

the processor, the memory and the communication interfaces are connected and communicated with each other via the bus;

the memory stores executable program codes;

the processor is configured for performing the navigation method provided by the present application by reading the executable program codes stored in the memory. Wherein, the navigation method of the present application includes:

receiving current position characteristic information sent by a mobile terminal, and determining a position of an area matching the current position characteristic information based on the current position characteristic information and a locally stored database, and taking the determined position as an initial position;

wherein, the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area;

receiving target position characteristic information sent by the mobile terminal, determining a position of an area matching the target position characteristic information based on the target position characteristic information and the database, and taking the determined position as a target position; and determining a first route from the initial position to the target position and displaying the first route on an electronic map of the mobile terminal.

In embodiments of the present application, a server can exactly determine an initial position based on the current position characteristic information sent by a mobile terminal and a locally stored database, and exactly determine a target position based on the target position characteristic information sent by the mobile terminal and the locally stored database, and thus determine a route from the initial position to the target position and display this route on an electronic map of the mobile terminal. As a result, the method can provide users with accurate navigation information and improve user experience.

Correspondingly, the present application provides an electronic apparatus, including:

a processor, a memory, communication interfaces and a bus;

the processor, the memory and the communication interfaces are connected and communicated with each other via the bus;

the memory stores executable program codes;

the processor is configured for performing the navigation method provided by the present application by reading the executable program codes stored in the memory. Wherein, the navigation method in the present application includes:

obtaining current position characteristic information and sending the current position characteristic information to a server, such that the server determines a position of an area matching the current position characteristic information based on the current position characteristic information and a locally stored database, and takes the determined position as an initial position; wherein the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area;

receiving target position characteristic information input by a user, and sending the target position characteristic information to the server, so that the server determines a position of an area matching the target position characteristic information based on the target position characteristic information and the database, takes the determined position as a target position and determines a route from the initial position to the target position; and receiving the route sent by the server, and displaying the route on an electronic map of the mobile terminal.

In embodiments of the present application, a server can exactly determine an initial position based on the current position characteristic information sent by a mobile terminal and a locally stored database, and exactly determine a target position based on the target position characteristic information sent by the mobile terminal and the locally stored database, and thus determine a route from the initial position to the target position and display this route on an electronic map of the mobile terminal. As a result, the method can provide users with accurate navigation information and improve user experience.

The embodiments of a device, a system, a storage medium, an application program and an electronic apparatus are briefly described and reference can be made to the description of the embodiments of a method for its related contents since the embodiments of the device are substantially similar to those of the method.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices including a series of elements include not only those elements listed, but also other elements not specifically listed or the elements intrinsic to these processes, methods, articles, or devices. Without further limitations, elements limited by the wording "include(s) a/an . . . " do not exclude that there are additional identical elements in the processes, methods, articles, or devices which include the listed elements.

All embodiments in the description are described in a correlated manner, and identical or similar parts in various embodiments can be referred to one another, the description for each embodiment all focuses on the differences with other embodiments. Especially, the embodiments of a device are briefly described and reference can be made to the description of the embodiments of a method for its related contents since the embodiments of the device are substantially similar to those of the method. The embodiments of a system or a device are briefly described and reference can be made to the description of the embodiments of a method for its related contents since the embodiments of the device are substantially similar to those of the method.

It can be understood by a person skilled in the art that all or a part of steps in the implementations of the above method can be carried out by related hardware being instructed by programs, which can be stored in computer readable storage medium, such as ROM/RAM, disk and optical disk etc.

The embodiments described above are just preferable embodiments of the present application, and not indented to limit the protection scope of the present application. Any modifications, alternatives, improvements or the like within the spirit and principle of the present application shall be included in the protection scope of the present application.

What is claimed is:

1. A method for navigation in a parking lot to assist a user to find a parked vehicle or park a vehicle, wherein the method is applied in a server, and comprises:
   receiving current position characteristic information sent by a mobile terminal carried by the user, and determining a position of an area matching the current position characteristic information based on the current position characteristic information and a locally stored database, and taking the determined position as an initial position, wherein the current position characteristic information comprises at least one of parking space identification information, a license plate number or a comparison image;
   wherein, the database is constructed by the server according to position information corresponding to respective areas and correspondence between characteristic information of the respective areas sent from one or more image acquiring apparatuses for each of areas and identification information of the respective areas, wherein the characteristic information of the respective areas is obtained based on characteristic images corresponding to the respective areas, which are acquired by an image acquiring apparatus for each area in response to a situation that the image acquiring apparatus detects that there is a change of content contained in this area, and wherein license plate numbers or images of currently parked vehicles, and identification information and position information corresponding to each of parking spaces are stored in the database;
   receiving target position characteristic information sent by the mobile terminal, determining a position of an area matching the target position characteristic information based on the target position characteristic information and the database, and taking the determined position as a target position, wherein the target position characteristic information comprises at least one of parking space identification information, a license plate number or a comparison image, and wherein in case that the user wants to find the parked vehicle, the target position is a position where the vehicle is parked, and in case that the user wants to park the vehicle, the target position is an idle parking space; and
   determining a first route from the initial position to the target position and displaying the first route on an electronic map of the mobile terminal;
   wherein after displaying the first route on the electronic map of the mobile terminal, the method further comprises:
   detecting, by the server, the current position of the mobile terminal, and displaying the current position on the electronic map of the mobile terminal;
   wherein detecting the current position of the mobile terminal comprises:
   receiving current position characteristic information periodically sent by the mobile terminal, determining the position of an area matching the current position characteristic information based on the current position characteristic information and the database, and taking the determined position as the current position;
   wherein the method further comprises:
   detecting whether an offset between the current position and the first route is greater than a predetermined threshold; and
   in response to that the offset is greater than the predetermined threshold, determining a second route from the current position to the target position according to the current position and the target position, and displaying the second route on the electronic map of the mobile terminal;
   wherein, after displaying the current position on the electronic map of the mobile terminal, the method further comprises:
   receiving, by the server after a position correction instruction sent by the mobile terminal and input by the user on the mobile terminal is received, the current position characteristic information sent by the mobile terminal, determining a position of an area matching the current position characteristic information based on the current position characteristic information and the database, and updating the current position of the mobile terminal with the determined position.

2. The method according to claim 1, wherein detecting the current position of the mobile terminal comprises:
   obtaining movement state of the mobile terminal according to an inertial sensor in the mobile terminal; and
   determining the current position of the mobile terminal based on the initial position and the movement state of the mobile terminal.

3. The method according to claim 1, wherein a characteristic image of each area is acquired by the image acquiring apparatus for this area after detecting a change of the content contained in this area.

4. A method for navigation in a parking lot to assist a user to find a parked vehicle or park a vehicle, wherein the method is applied in a mobile terminal carried by the user, and comprises:
   obtaining current position characteristic information and sending the current position characteristic information to a server, such that the server determines a position of an area matching the current position characteristic information based on the current position characteristic information and a locally stored database, and takes the determined position as an initial position; wherein the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area in response to a situation that the image acquiring apparatus detects that there is a change of content contained in this area, and wherein license plate numbers or images of currently parked vehicles, and identification information and position information corresponding to each of parking spaces are stored in the database, the current position characteristic information comprises at least one of parking space identification information, a license plate number or a comparison image;

receiving target position characteristic information input by the user, and sending the target position characteristic information to the server, so that the server determines a position of an area matching the target position characteristic information based on the target position characteristic information and the database, takes the determined position as a target position and determines a first route from the initial position to the target position, wherein the target position characteristic information comprises at least one of parking space identification information, a license plate number or a comparison image, and wherein in case that the user wants to find the parked vehicle, the target position is a position where the vehicle is parked, and in case that the user wants to park the vehicle, the target position is an idle parking space; and receiving the first route sent by the server, and displaying the first route on an electronic map of the mobile terminal;

wherein after displaying the first route on the electronic map, the method further comprises:

receiving the current position of the mobile terminal sent by the server after detecting the current position of the mobile terminal; and displaying the current position on the electronic map of the mobile terminal;

wherein the current position of the mobile terminal is detected by the server through receiving current position characteristic information periodically sent by the mobile terminal, determining the position of an area matching the current position characteristic information based on the current position characteristic information and the database, and taking the determined position as the current position;

wherein the method further comprises:

receiving a second route sent by the server after detecting whether an offset between the current position and the first route is greater than a predetermined threshold and determining the second route from the current position to the target position according to the current position and the target position in response to that the offset is greater than the predetermined threshold; and displaying the second route on the electronic map of the mobile terminal;

sending a position correction instruction input by the user on the mobile terminal to the server, so that after receiving the position correction instruction, the server receives the current position characteristic information sent by the mobile terminal, determines a position of an area matching the current position characteristic information based on the current position characteristic information and the database, and updates the current position of the mobile terminal with the determined position.

5. The method according to claim 4, wherein obtaining current position characteristic information comprises:

receiving current position characteristic information input by the user;

acquiring a characteristic image and taking the characteristic image as the current position characteristic information; or acquiring a characteristic image and extracting the current position characteristic information from the characteristic image, wherein the current position characteristic information comprises at least one of: an image containing a preset area in the characteristic image, and characters in the preset area.

6. A system for navigation in a parking lot to assist a user to find a parked vehicle or park a vehicle, wherein the system comprises: cameras installed at respective areas, a server and a mobile terminal carried by the user; wherein, the cameras acquire characteristic images of the respective areas;

the server is configured for performing a method for navigation in a parking lot to assist a user to find a parked vehicle or park a vehicle, comprising:

receiving current position characteristic information sent by the mobile terminal, and determining a position of an area matching the current position characteristic information based on the current position characteristic information and a locally stored database, and taking the determined position as an initial position, wherein the current position characteristic information comprises at least one of parking space identification information, a license plate number or a comparison image;

wherein, the database is constructed by the server according to position information corresponding to respective areas and correspondence between characteristic information of the respective areas sent from one or more image acquiring apparatus for each of areas and identification information of the respective areas, wherein the characteristic information of the respective areas is obtained based on characteristic images corresponding to the respective areas, which are acquired by an image acquiring apparatus for each area in response to a situation that the image acquiring apparatus detects that there is a change of content contained in this area, and wherein license plate numbers or images of currently parked vehicles, and identification information and position information corresponding to each of parking spaces are stored in the database;

receiving target position characteristic information sent by the mobile terminal, determining a position of an area matching the target position characteristic information based on the target position characteristic information and the database, and taking the determined position as a target position, wherein the target position characteristic information comprises at least one of parking space identification information, a license plate number or a comparison image, and wherein in case that the user wants to find the parked vehicle, the target position is a position where the vehicle is parked, and in case that the user wants to park the vehicle, the target position is an idle parking space; and determining a route from the initial position to the target position and displaying the first route on an electronic map of the mobile terminal;

detecting, by the server, the current position of the mobile terminal, and displaying the current position on the electronic map of the mobile terminal;

detecting whether an offset between the current position and the first route is greater than a predetermined threshold; and in response to that the offset is greater than the predetermined threshold, determining a second route from the current position to the target position according to the current position and the target position, and displaying the second route on the electronic map of the mobile terminal;

receiving, after a position correction instruction sent by the mobile terminal and input by the user on the mobile terminal is received, the current position characteristic information sent by the mobile terminal, determining a position of an area matching the current position characteristic information based on the current position characteristic information and the database, and updating the current position of the mobile terminal with the determined position;

wherein detecting the current position of the mobile terminal comprises:

receiving current position characteristic information periodically sent by the mobile terminal, determining the position of an area matching the current position characteristic information based on the current position characteristic information and the database, and taking the determined position as the current position;

the mobile terminal comprises a processor and a memory for storing executable program codes, wherein the executable program codes are executed by the processor, so as to cause the processor to perform operations, comprising:

obtaining current position characteristic information and sending the current position characteristic information to the server, such that the server determines a position of an area matching the current position characteristic information based on the current position characteristic information and the database, and takes the determined position as an initial position;

receiving target position characteristic information input by the user, and sending the target position characteristic information to the server, so that the server determines a position of an area matching the target position characteristic information based on the target position characteristic information and the database, takes the determined position as a target position and determines a first route from the initial position to the target position; and receiving the first route sent by the server, and displaying the first route on an electronic map of the mobile terminal;

receiving the current position of the mobile terminal sent by the server after detecting the current position of the mobile terminal; and displaying the current position on the electronic map of the mobile terminal;

receiving a second route sent by the server after detecting whether an offset between the current position and the first route is greater than a predetermined threshold and determining the second route from the current position to the target position according to the current position and the target position in response to that the offset is greater than the predetermined threshold; and displaying the second route on the electronic map of the mobile terminal;

sending a position correction instruction input by the user on the mobile terminal to the server, so that after receiving the position correction instruction, the server receives the current position characteristic information sent by the mobile terminal, determines a position of an area matching the current position characteristic information based on the current position characteristic information and the database, and updates the current position of the mobile terminal with the determined position.

7. An electronic apparatus, comprising:
a processor, a memory, communication interfaces and a bus;
the processor, the memory and the communication interfaces are connected and communicated with each other via the bus;
the memory stores executable program codes;
the processor executes a program corresponding to the executable program codes by reading the executable program codes stored in the memory, so as to implement the method according to claim 1.

8. An electronic apparatus, comprising:
a processor, a memory, communication interfaces and a bus;
the processor, the memory and the communication interfaces are connected and communicated with each other via the bus;
the memory stores executable program codes;
the processor executes a program corresponding to the executable program codes by reading the executable program codes stored in the memory, so as to implement the method according to claim 4.

* * * * *